United States Patent [19]

Franz

[11] 4,160,741

[45] Jul. 10, 1979

[54] BENZOTHIAZOLE ACCELERATORS STABILIZED WITH OXIRANE COMPOUNDS

[75] Inventor: Curtis A. Franz, Piscataway, N.J.

[73] Assignee: American Cyanamid Company, Stamford, Conn.

[21] Appl. No.: 814,601

[22] Filed: Jul. 11, 1977

[51] Int. Cl.$^2$ .................... C08C 4/00; C07D 277/78; C07D 277/80; C08K 5/47
[52] U.S. Cl. .................................. 252/182; 252/402; 252/403; 260/306.5; 260/306.6 A; 260/785; 260/800; 260/773
[58] Field of Search .................. 260/306.5, 306.6 A, 260/800; 252/402, 403, 182; 526/33

[56] References Cited

U.S. PATENT DOCUMENTS

| | | | |
|---|---|---|---|
| B 245,194 | 1/1975 | Maxey | 252/182 |
| 3,539,538 | 11/1970 | Behforouz | 526/33 |
| 3,689,467 | 9/1972 | Boustany et al. | 526/33 |

FOREIGN PATENT DOCUMENTS

| | | | |
|---|---|---|---|
| 7308442 | 12/1973 | Netherlands | 252/182 |
| 414273 | 5/1974 | U.S.S.R. | 526/32 |

*Primary Examiner*—Donald G. Daus
*Assistant Examiner*—D. B. Springer
*Attorney, Agent, or Firm*—Frank M. Van Riet

[57] ABSTRACT

Oxirane compounds having a molecular weight greater than 60 have been found to be effective stabilizers for benzothiazole rubber accelerators.

6 Claims, No Drawings

BENZOTHIAZOLE ACCELERATORS STABILIZED WITH OXIRANE COMPOUNDS

BACKGROUND OF THE INVENTION

Many 2-benzothiazole rubber accelerator compounds are known and some are widely used in the rubber industry. While the compounds are readily prepared according to well-known procedures in a high state of purity, most, if not all, of them deteriorate when exposed to elevated temperatures and/or humid conditions. The deterioration is manifested by a gradual build-up of mercaptobenzothiazyl disulfide (MBTS) resulting in an alteration of the cure characteristics normally exhibited by the accelerator when used in a rubber vulcanizate. Since elevated temperatures and humid conditions are common in the summer months and throughout the warmer areas of the world, it is desirable to find a means for either stopping or retarding this deterioration without destroying the accelerating activity of the compound.

SUMMARY OF THE INVENTION

It has now been found that the incorporation of a minor amount of a oxirane (epoxy) compound into freshly prepared benzothiazoles significantly reduces the deterioration of the benzothiazoles on exposure to temperature and/or humidity.

DESCRIPTION OF THE INVENTION INCLUDING PREFERRED EMBODIMENTS

2-Benzothiazoles may be represented by the general formula:

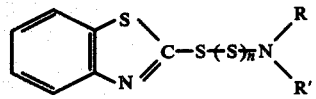

wherein R and R' individually represent hydrogen, alkyl of 1 to 8 carbon atoms, inclusive, cycloalkyl of 5 to 6 carbon atoms, inclusive, or, taken together with the nitrogen atom, combine to form a heterocyclic ring, and n is 0 or 1. They are readily prepared by well-known procedures see, for example, U.S. Pat. Nos. 2,730,526; 2,730,527; 2,758,995; 2,776,297; 2,840,556; 2,981,325; 3,055,909; 3,161,648; 3,658,808. Some of the more commonly used accelerators include N-isopropyl-2-benzothiazole sulfenamide; N,N-diisopropyl-2-benzothiazole sulfenamide; N-t-butyl-2-benzothiazole sulfenamide; N-cyclohexyl-2-benzothiazole sulfenamide; N,N-dicyclohexyl-2-benzothiazole sulfenamide; N-oxydiethylene-2-benzothiazole sulfenamide; 4-morpholinyl-2-benzothiazole disulfide; N-t-octyl-2-benzothiazole sulfenamide; N,N-dicyclopentyl-2-benzothiazole sulfenamide; N,N-diethyl-2-benzothiazole sulfenamide; N-methyl-2-benzothiazole sulfenamide and the like.

The oxirane compounds which may be used to stabilize the benzothiazoles include any solid or liquid compound having a molecular weight greater than 60 (ethylene oxide-gas) which is free of functional groups, other than the oxirane ring, which can react with the benzothiazole. Suitable compounds include: mono-, di- or polyepoxides such as alkyl, cycloalkyl and aryl glycidyl ethers; mono- and diepoxidized alkenes and dienes, including epoxidized polydienes, such as 1,2- and 2,3-epoxybutane, and epoxybutadiene; cycloalkylene oxides, such as cyclohexene oxide and vinyl cyclohexene diepoxide; diglycidyl ethers of aliphatic diols, such as the diglycidyl ether of 1,4-butanediol; diglycidyl ethers of bisphenols, such as the diglycidyl ether of isopropylidine bis phenol (Bis Phenol A) or diglycidyl ethers of methylenebisphenol, and oligomers thereof; epoxidized unsaturated oils, such as epoxidized linseed oil; diglycidyl ethers of polymeric diols and polyols, and the like.

The oxirane compound is used to stabilize the benzothiazole in an amount effective to prevent or retard deterioration. In general an amount ranging from about 0.1 percent, by weight, to about 5 percent, by weight, is suitable, preferably about 0.5 to 2 percent, by weight, based on the weight of the sulfenamide. The amount used will vary depending on the inherent stability of the benzothiazole, on the nature of the oxirane stabilizer, and on the severity of the conditions of heat and humidity encountered.

The oxirane compound may be incorporated into the benzothiazole by any convenient manner, such as by dry blending. Often the benzothiazoles are prepared by cooling and flaking the molten compound. In this case, it is possible to incorporate the oxirane compound into the melt before cooling and flaking, the method of incorporation not being critical.

The following examples are set forth for purposes of illustration only and are not to be construed as limits on the instant invention except as set forth in the appended claims. All parts and percentages are by weight unless otherwise specified.

EXAMPLE 1

Stabilization of N-Isopropyl-2-Benzothiazole Sulfenamide

Samples of N-isopropyl-2-benzothiazole sulfenamide are mixed with 2% of (A) 2,3-epoxypropyl-n-hexyl ether and (B) 2,2-bis[4-(2,3-epoxypropoxy)phenyl]propane. The samples are then exposed for periods of 2 weeks and 4 weeks at normal room temperature and 75% humidity and then analyzed for build-up of mercaptobenzothiazyldisulfide (MBTS). The results are shown below in Table I.

TABLE 1

| Example | Initial | % MBTS 2 Weeks at 75% RH | 4 Weeks at 75% RH | % Assay loss 4 Weeks at 75% RH |
|---|---|---|---|---|
| Control | 0.002 | 0.54 | 1.73 | 6.1 |
| 1 A | 0.001 | 0.02 | 0.58 | — |
| 1 B | 0.001 | 0.01 | 0.22 | 1.6 |

The data illustrate the effectiveness of the epoxy compounds in preventing deterioration of the sulfenamide on exposure to humidity, as manifested by build-up on MBTS.

EXAMPLE 2

Samples of N-isopropyl-2-benzothiazole sulfenamide are mixed with 2% of (C) 3,4-epoxycyclohexyl methyl-3,4-epoxycyclohexane carboxylate and (D) epoxidized butyl linseed oil. The samples are then exposed for periods of 2 weeks at 75% RH and 2 weeks at 45° C./25% RH and then analyzed for build-up of MBTS. Results are shown below in Table II.

TABLE II

| Example | Initial | 2 Weeks at 75% RH | 2 Weeks 45° C./25% RH |
|---|---|---|---|
| | | % MBTS | |
| Control | 0.002 | 0.26 | 1.01 |
| 2 C | 0.002 | 0.008 | 0.01 |
| 2 D | 0.001 | 0.09 | 0.43 |

EXAMPLE 3

A sample of N-isopropyl-2-benzothiazole sulfenamide is mixed with 2% of (E) epoxidized linseed oil and the sample is exposed for periods of 2 weeks at 45° C. and 4 weeks at 75% RH. The sample is then analyzed for build-up of MBTS. The results are set forth in Table III, below.

TABLE III

| Example | Initial | 2 Weeks at 45° C. | 2 Weeks at 75% RH | % Assay loss 5 Weeks at 45° C. |
|---|---|---|---|---|
| | | % MBTS | | |
| Control | 0.003 | 0.21 | 1.7 | 2.8 |
| 3 E | 0.002 | 0.006 | 0.02 | 1.3 |

EXAMPLE 4

Stabilization of N,N-Diisopropyl-2-Benzothiazole Sulfenamide

A sample of N,N-diisopropyl-2-benzothiazole sulfenamide is mixed with 2% of (E) epoxidized linseed oil and then exposed for 10 weeks at 45° C./25% RH. The sample is then analyzed for MBTS build-up. The results are set forth in Table IV, below.

TABLE IV

| Example | Initial | 10 Weeks 45° C./25% RH | % Assay loss |
|---|---|---|---|
| | | % MBTS | |
| Control | 0.00 | 0.22 | 2.3 |
| 4 E | 0.00 | 0.00 | 0.9 |

EXAMPLE 5

The following sulfenamides are mixed with epoxide (C), as shown in Table V, and then exposed for periods of one week and 2 weeks at 45° C./25% RH. The samples are then analyzed for MBTS build-up.

N-tert.butyl-2-benzothiazole sulfenamide    I.

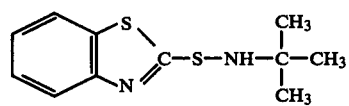

N-oxydiethylene-2-benzothiazole sulfenamide    II.

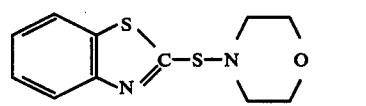

N-cyclohexyl-2-benzothiazole sulfenamide    III.

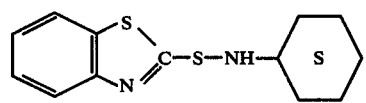

TABLE V

| Example | Initial | 1 Week | 2 Weeks | 5 Weeks |
|---|---|---|---|---|
| | | % MBTS | | |
| 5-I | 0.003 | 1.02 | — | — |
| 5-I+1% C | 0.004 | 0.18 | — | — |
| 5-II | 0.002 | 0.008 | 0.12 | 3.94 |
| 5-II+3% C | 0.002 | 0.004 | 0.02 | 0.02 |
| 5-III | 0.004 | 0.56 | 1.62 | — |
| 5-III+1% C | 0.01 | 0.06 | 0.06 | — |

EXAMPLES 6–11

The procedure of Example 4E is again followed except that the epoxy compound, in each instance, is replaced by:
6. 3% of vinylcyclohexene diepoxide
7. 1.5% of styrene oxide
8. 2.0% of the diglycidyl ether of 1,4-butanediol
9. 1.0% of the diglycidyl ether of 4,4'-iso-propylidenebisphenol
10. 2.0% of the glycidyl ether of phenol-formaldehyde condensate
11. 3.0% of epoxidized soybean oil In each instance, a substantially equivalent reduction in MBTS build-up is observed.

EXAMPLES 12–19

The procedure of Example 1B is again followed except that the N-isopropyl-2-benzothiazole sulfenamide is replaced by:
12. 4-morpholinyl-2-benzothiazole disulfide
13. N,N-dicyclohexyl-2-benzothiazole sulfenamide
14. N-t-octyl-2-benzothiazole sulfenamide
15. N,N-dicyclopentyl-2-benzothiazole sulfenamide
16. N-methyl-2-benzothiazole sulfenamide
17. N-isopropyl-2-benzothiazole disulfide
18. N,N-diisopropyl-2-benzothiazole disulfide
19. N,N-diethyl-2-benzothiazole sulfenamide.

In each instance, the 2,2-bis[4-(2,3-epoxypropoxy)phenyl]propane effectively prevented deterioration of the compounds.

I claim:
1. A stabilized accelerator composition for rubber comprising (1) a benzothiazole having the formula

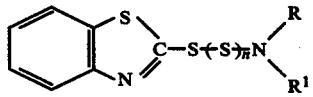

wherein R and R[1] are, individually, hydrogen alkyl of 1-8 carbon atoms, inclusive, cycloalkyl of 5-6 carbon atoms, inclusive, or, taken with the nitrogen, combine to form a morpholine, piperidine or pyrrolidine heterocyclic ring, and n is 0 or 1 and (2) an effective stabilizing amount of a solid or liquid oxirane compound having a molecular weight greater than 60 which is free of interfering functional groups.

2. A composition according to claim 1 wherein (1) is N-isopropyl-2-benzothiazole sulfenamide.
3. A composition according to claim 1 wherein (1) is N,N-diisopropyl-2-benzothiazole sulfenamide.
4. A composition according to claim 1 wherein (1) is N-cyclohexyl-2-benzothiazole sulfenamide.
5. A composition according to claim 1 wherein (2) is 2,2-bis[4-(2,3-epoxypropoxy)phenyl]propane.
6. A composition according to claim 1 wherein (2) is epoxidized linseed oil.

* * * * *